United States Patent

[11] 3,602,795

[72] Inventor John B. Gunn
 Mount Kisco, N.Y.
[21] Appl. No. 866,929
[22] Filed Oct. 16, 1969
[45] Patented Aug. 31, 1971
[73] Assignee International Business Machines Corporation
 Armonk, N.Y.

[54] TRANSFORMERLESS POWER SUPPLY
 14 Claims, 5 Drawing Figs.
[52] U.S. Cl. .................................................. 321/15
[51] Int. Cl. .................................................. H02m 7/00
[50] Field of Search .................................... 321/15, 2

[56] References Cited
 UNITED STATES PATENTS
| 3,470,443 | 9/1969 | Berry et al. | 321/2 |
| 3,470,446 | 9/1969 | Berry et al. | 321/2 |
| 3,477,011 | 11/1969 | Westwood | 321/15 |
| 3,478,258 | 11/1969 | Nagai | 321/15 |
| 3,505,586 | 4/1970 | Dulin | 321/15 |
| 3,513,376 | 5/1970 | Hajek | 321/15 |

OTHER REFERENCES

ELECTRONICS, "D-C Converter Circuit Uses Capacitors," pp. 97–98 March 21, 1966, copy in 321-15.

Primary Examiner—William M. Shoop, Jr.
Attorneys—Hanifin and Jancin and John E. Dougherty, Jr.

ABSTRACT: The power supply circuit receives as an input an AC line voltage, rectifies the line voltage to DC and transforms the voltage downwardly to a much lower level. No transformer is employed but rather the power supply circuit includes a plurality of capacitors which are charged in series by the line voltage and discharged in parallel across the load. The charging and discharging is controlled by a diode and transistor connected to each capacitor and to each other so that the diode conducts during the charging and then maintains the transistor nonconductive and the transistor conducts during the discharge when the diode is nonconductive.

3,602,795

INVENTOR
JOHN B. GUNN

BY John E. ...
ATTORNEY 3,602,795

TRANSFORMERLESS POWER SUPPLY

BACKGROUND OF THE INVENTION

1. Field of the Invention

The present invention relates to circuits for converting an input voltage from a high amplitude to a lower amplitude DC; more specifically, the invention relates to power supply circuits for electronic equipment such as computers which receive as an input a high AC voltage from the line and supply at an output a lower DC voltage.

2. Description of the Prior Art

The most commonly used power supply circuits employ transformers for first transforming the input AC voltage to a lower level and then converting the transformed voltage to the DC which is required by the load. It has also been known to convert voltages from one level to another by the use of series and parallel connections between capacitors. For example, the use of capacitors which are charged in parallel and discharged in series to step up a DC voltage is well known in the art.

SUMMARY OF THE INVENTION

The use of transformers in the normal power supply application involves disadvantages in the form of weight and bulk, and the connections between line and load through the transformer which can result in line spikes being transmitted from the line to the equipment and data in equipment such as computers being transmitted back to the line. However, up until this time no practical alternative has been available. In accordance with the principles of the present invention, a transformerless power supply is provided by the use of an electronic circuit including solid state components and capacitors which is not bulky, is neither overly complex nor expensive, provides isolation between load and line, and can be easily regulated. These advantages are achieved by a circuit in which the line voltage, typically AC, is applied to charge a plurality of capacitors in series and these capacitors are discharged in parallel to provide the required lower level DC voltage to the load. The control over the charging and discharging is completely within the circuit and is achieved most simply by the use of two current control elements for each capacitor, one in the charging circuit and one in the discharging circuit, which are so interconnected that only one can conduct at a time. As a result, the charging and discharging is controlled and the line and load are never operatively connected to the capacitor at the same time. Isolation, full-wave rectification, and regulation are also achieved with the addition of a small number of electronic components.

Therefore, it is an object of the present invention to provide a transformerless power supply circuit.

It is a further object to provide an improved power supply circuit for receiving as an input an AC line voltage and supplying to an output a DC voltage at a lower level.

It is another object to provide a power supply circuit of the above-described type in which isolation between load and line is achieved and which supplies a regulated output voltage.

These and other objects, features and advantages of the invention will be apparent from the following more particular description of preferred embodiments of the invention, as illustrated in the accompanying drawings.

DESCRIPTION OF PREFERRED EMBODIMENTS

Figure 1:
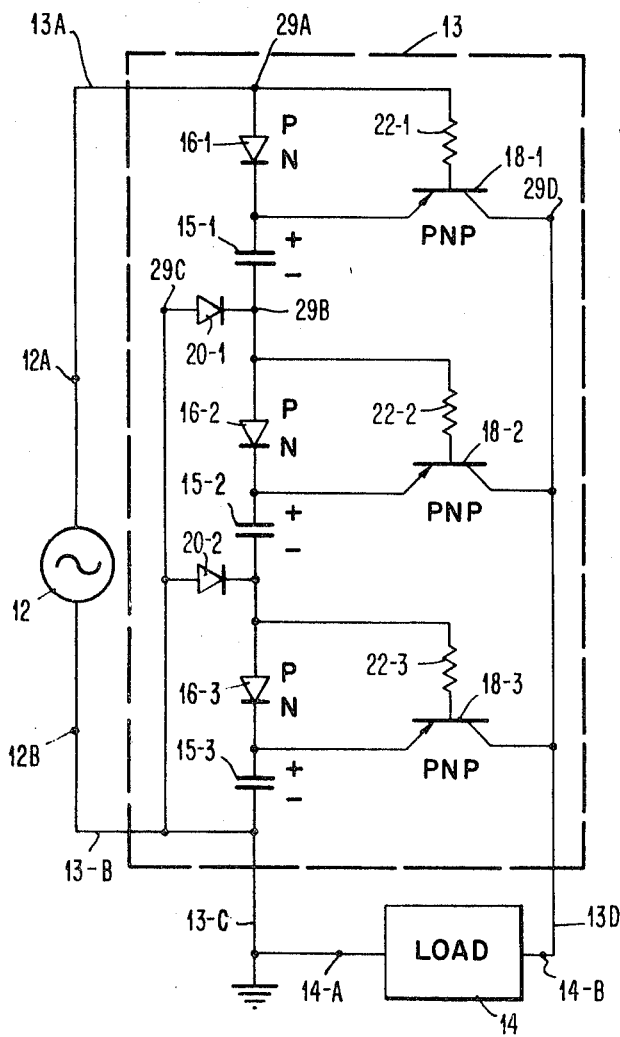
FIG. 1 is a circuit diagram of a half-wave power supply according to the invention.

The circuit shown in FIG. 1 is an embodiment of a power supply circuit for transforming and rectifying high voltage AC input power to lower voltage DC power. The circuit is rudimentary in that only half-wave rectification of the input AC power is obtained and the input (line) and output (load) circuits are not isolated from each other. Specifically, the input circuit of FIG. 1 is an AC source 12 which provides high voltage AC at a pair of terminals 12A and 12B. The circuit for transforming and rectifying this input AC is shown enclosed within a dotted block 13. This circuit may be considered to have two input leads designated 13A and 13B which are connected to the terminals 12A and 12B, and two output leads 13C and 13D which are connected to the terminals 14A and 14B of a load circuit generally represented by a block 14.

The function of the power supply circuit 13 is to transform the AC voltage received from source 12 to a low value of DC voltage which is applied across the load circuit. The circuit is referred to as a power supply circuit since it is typically connected in electronic equipment such as a computer which operates on low voltage DC and is connected to higher voltage AC power supply lines. The transforming function is performed in the circuit by a group of capacitors which are charged in series by the AC supply 12 and discharged in parallel across the load 14. In the embodiment shown, there are three of these capacitors designated 15–1, 15–2 and 15–3, and the circuit can be considered to include three stages, one associated with each of these capacitors. As will become clear as the description of this and the other embodiments progresses, the power supply circuits can include any number of stages in which case the additional stages are identical to the middle stage associated with capacitor 15–2. The upper and lower stages may include somewhat different components.

Figure 1A:
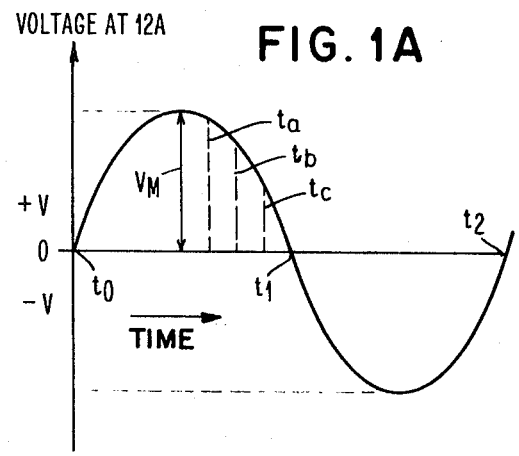
FIG. 1A is a plot depicting the voltage at one of the input terminals for the circuit of FIG. 1.

In the embodiment of FIG. 1, a series circuit is formed between the leads 13A and 13B which includes diodes 16–1, 16–2, 16–3 and the capacitors 15–1, 15–2 and 15–3. When the voltage from source 12 is such that the voltage at terminal 12A is positive, the polarity is correct for current flow through this series circuit. The AC voltage at terminal 12A is depicted in FIG. 1A with the positive voltage swing which produces current flow in the series circuit including the three capacitors being represented between times $t_0$ and $t_1$. Actually there is no conduction in this series circuit between terminals 13A and 13B until the voltage across this circuit exceeds the forward voltage drops for the three diodes 16–1. Each of these diodes has a voltage drop of about 1 volt and when the applied voltage after time $t_0$ (FIG. 1A) reaches a sufficient voltage, current flow begins in the series circuit to charge the capacitors 15–1, 15–2 and 15–3. Thus, all three capacitors begin to be charged at the same time, and each being connected in this series circuit receives the same charging current.

During this charging period, when terminal 12A is positive with respect to terminal 12B, there is no current flow through the parallel circuits which are active only during the capacitor discharge. Specifically, there are three transistors 18–1, 18–2; 18–3, and two diodes 20–1, 20–2 shown in these parallel circuits. As long as the voltage applied is positive, the supply current cannot flow through diodes 20–1 and 20–2. At the same time, with diodes 16–1, 16–2 and 16–3 conducting there is a small voltage drop across each of these diodes, and the bases of the transistors 18 are maintained positive with respect to their emitters. Since the transistors are PNP type, the emitter junctions are reverse biased and there is no current flow through these transistors. This condition persists as the voltage rises to its maximum positive value shown at $V_M$ in FIG. 1A. The three capacitors 15 are each charged to voltage which is less than one third the voltage $V_M$ by the sum of the forward voltage drops in the remainder of circuit including diodes 16. The polarity of the charge on the capacitors at this time is indicated in FIG. 1.

When the voltage between terminals 12A and 12B passes the peak value $V_M$ and begins to decrease, the voltage drop across the three diodes 16–1, 16–2 and 16–3 approaches zero and then goes negative at the point at which the value of the applied voltage is less than the total voltage stored in the three capacitors. There is then no conduction through the charging series circuit and no forward drop across diodes 16 to prevent conduction in transistors 18.

The cut off of diodes 16 and termination of the charging of capacitors 15 occurs very shortly after the supply voltage begins to decrease from its maximum value $V_M$. This causes diode 16 to be reverse biased, and the base-emitter junctions or transistor 18–1 to be forward biased, and there is then a small current flow through the resistor 22–1 which connects the terminal 12A of the supply to the base of transistor 18–1 for the first stage. Current then flows through the emitter-collector circuit of transistor 18–1 with a gain over that supplied to the base, and this larger current is applied through the resistor 22–2 to the base of transistor 18–2. The action described above is again repeated to produce a larger current flow through transistor 18–2 which in turn results in the turning on of transistor 18–3 with more current flow in its emitter-collector circuit.

Figure 1B:
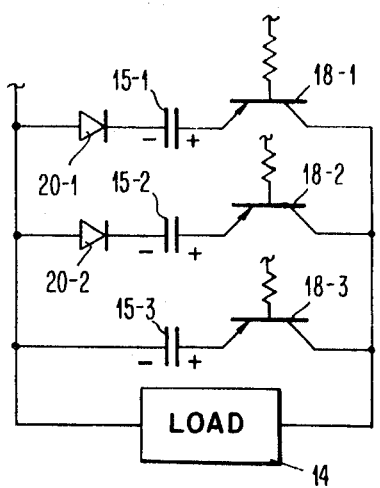
FIG. 1B is a schematic showing of the components of the circuit of FIG. 1 which form the parallel output discharge circuit.

Thus, the transistors 18–1, 18–2, 18–3 control each other from top to bottom so that the bottom transistor 18–3 is the first to turn on hard and actually discharge its associated capacitor 15–3 and deliver power to load 14. The elements of the parallel discharge circuits which deliver power to the load are illustrated in the schematic drawing of FIG. 1B. The capacitor 15–3 under control of the conduction through transistor 18–3 first begins to discharge and supply power to load 14 at a time $t_a$ shown in FIG. 1A. As the supply voltage decreases, diode 20–2 begins to conduct and capacitor 15–2 to discharge at time $t_b$ through the load in parallel with capacitor 15–3. Finally, as the supply voltage continues to drop, diode 20–1 conducts and capacitor 15–1 begins to discharge through the load 14 at time $t_c$.

It should be noted here that the complementary action produced by the connection between the diode 16 and transistor 18 for each of the three stages ensures that each capacitor is connected either to the supply voltage through the diode 16 or to the load through the emitter-collector circuit of the transistor, but never to both at the same time. When any one of the diodes 16 is conducting, the associated transistor 18 is turned off, and similarly, when any one of the transistors is conducting, no current flow can occur through the associated diode.

Once the three capacitors 15 begin to discharge as described above shortly after the peak value $V_M$ is reached and the supply voltage begins to decrease, the discharge through the load continues throughout the negative going portion of the supply voltage cycle until after time $t_2$. Then the transistors 18–1, 18–2, 18–3 switch off in the sequence given and the discharge of the capacitors to the load is terminated in a manner similar to its initiation with capacitor 15–1 being the first to be disconnected from the load and capacitor 15–3 being the last. The charging of all three capacitors begins shortly thereafter, and the operation described above is repeated as the positive applied voltage rises sufficiently to allow conduction through diodes 16–1, 16–2 and 16–3 in the series charging circuit. It should be particularly noted that during the first cycle of operation, a much greater charge over a larger portion of the positive half of the supply voltage cycle is delivered to the capacitors 15. This is so since the capacitors are initially in an uncharged condition and the supply voltage need rise only slightly to overcome the drop in the three series connected diodes 16 to begin the charging operation. However, in the subsequent discharging operation only a small part of the charge is expended to the load and when the supply voltage goes positive again at time $t_2$, conduction in the series circuit does not begin until the supply voltage is above the voltage stored in the three capacitors by an amount in excess of the forward drop voltage across the three diodes 16.

During the first cycle of operation, the capacitors are charged during a significant portion of the positive going excursion of the supply voltage, approaching one half the time $t_o$ to $t_1$ and, of course, less than one-fourth of the total period of the input AC voltage. During subsequent cycles, the charging time is much less and can vary depending upon the characteristics of the capacitors used and the actual amount of charge delivered to the load. In any case the discharge time during which each capacitor is delivering voltage across the load is in excess of one-half of the period of the AC supply voltage ($t_o$–$t_2$) and the charging time is much less than one-half, and, in fact, usually less than one-fourth of the supply voltage period.

At the same time, as pointed out above, the capacitors are operatively connected either in series with the supply or in parallel with the load but never to both at the same time. Since each of the charging capacitors is charged in a series circuit, each receives the same charge, and the mean currents supplied by the capacitors 15 and transistors 18 to load 14 during the discharge (FIG. 1B) is the same. This is an important consideration because, in conventional parallel operations of switching transistors, current sharing has to be enforced by the use of emitter series resistors, which are not needed in this case. Further, the resistors 22 for the base connections of the transistor are chosen relative to the circuit that during the discharging the transistors are operated in the saturation portion of their characteristic. Thus, the approximately linear response of the transistors, during the discharge, to differences in voltage across the capacitors, ensures that a capacitor with an unusually high voltage discharges more, and one with low voltage less, than the average. This tends to equalize the capacitor voltages, despite differences between components. Though the capacitors are discharging for different lengths of time during each cycle, that is, capacitor 15–3 in the lowest stage is connected to the load for the longest time and capacitor 15–1 is connected to discharge for the shortest time during each cycle, no problems arise, because of the self-equalizing effects described above.

In summary, it can be seen that each of the stages of the circuit can be considered to include four terminals, 29A, 29B, 29C and 29D which are illustrated for the first stage. The terminals 29A and 29B for the stages are connected together in series to form the series charging circuit. The terminals 29C and 29D for the stages are connected in parallel to form the parallel discharge circuit for the load.

Figure 2:
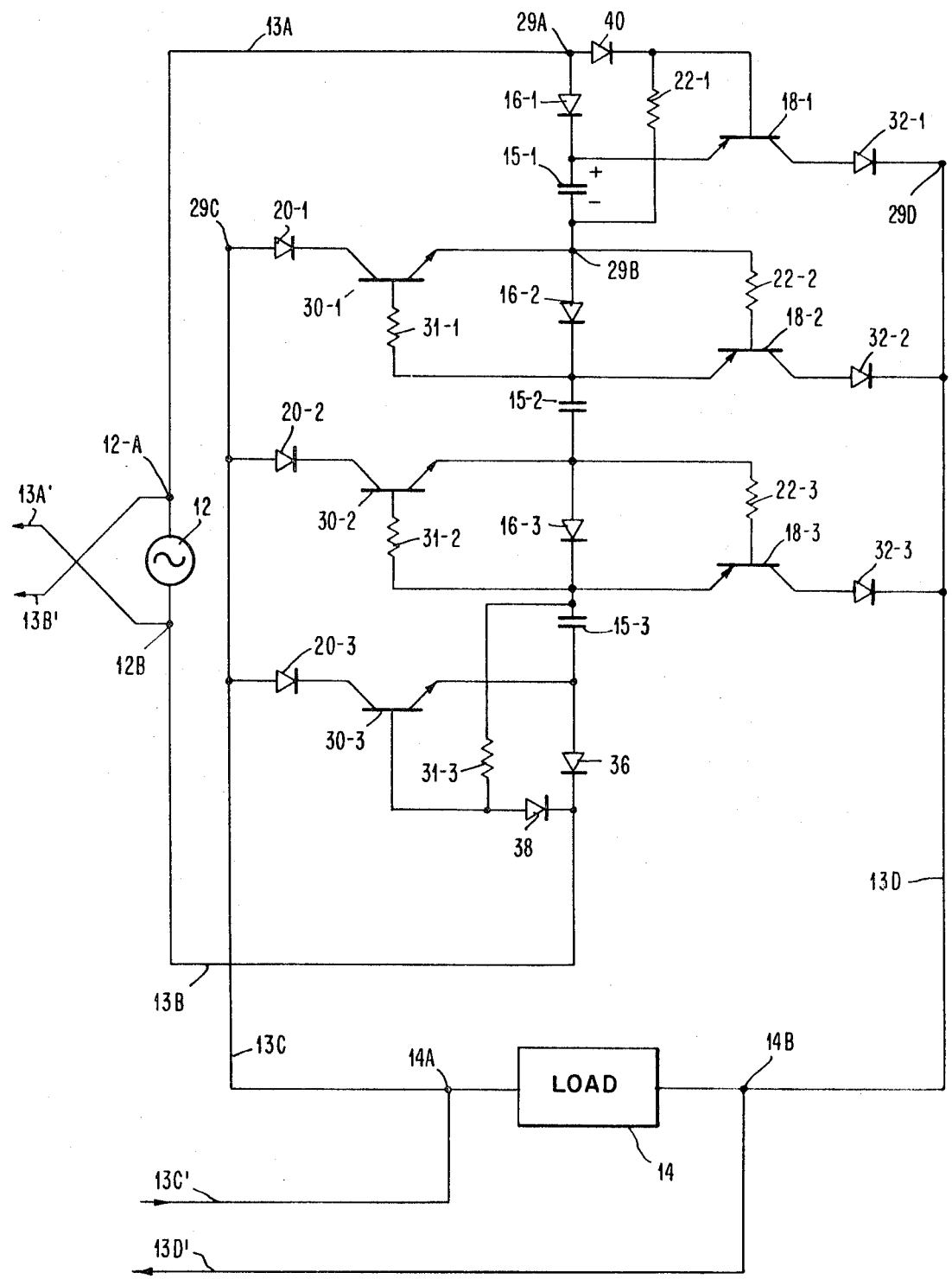
FIG. 2 is a circuit diagram of a power supply circuit according to the invention which includes additional components for isolation and which can be used in full-wave applications.

FIG. 2 is a circuit diagram of a power supply circuit similar to that of FIG. 1 in which components have been added so that isolation is achieved. Isolation is here used to define a circuit in which either side of the load (terminals 14A or 14B) can be connected to either side of the line (terminal 12A or 12B) without interfering with circuit operation and with only a minimum of leakage current (about 100 microamperes or less) in the interconnecting wire. With this type of isolation, two of the half wave circuits can be used to obtain full wave rectification and most safety requirements can be met. In the circuit of FIG. 2, the same reference numerals are used as were used in FIG. 1 to identify components common to both figures. The additional components in FIG. 2 include three transistors 30–1, 30–2, 30–3, three diodes 32–1, 32–2, 32–3, and three resistors 31–1, 31–2, 13–3. Further, a diode 20–3 and diodes 36 and 38 have been added to the last stage and a diode 40 has been added to the first stage. These additional components are required in the upper and lower stages to achieve proper isolation. Also the resistors 22–1 and 31–1 are connected differently in the upper and lower stages for the same reason.

As to the function of the additional components in the circuit of FIG. 2, diodes 32–1, 32–2 and 32–3 and transistors 30–1, 30–2 and 30–3, ensure that the load 14 and line 12 can be isolated regardless of what polarity of voltage is applied between them. Thus, for example, with the diode 32–1 in series with the emitter-collector circuit of transistor 18–1 current can flow in the collector only when the base is turned on, regardless of the polarity of the collector-base voltage. The same is true in the emitter-collector circuit of transistor 30–1 which has diode 20–1 connected in series with it. Transistor 30–1 is connected in a complementary fashion with diode 16–2 so that in a manner similar to like components described above with reference to FIG. 1 conduction is possible either through the diode or through the transistor but not through both at the same time. The same is true as to the connection between transistor 30–2 and diode 16–3 and transistor 30–3 and diode 36 which has been added to the circuit for this reason. Diode 40 has been added to the first stage and diode 38 to the last stage and the connections on resistors 22–1 and 31–3 for these stages altered in order to make the magnitude of the drive current for controlling the conduction through the transistors 18–1 and 30–3 independent of any interconnection between line and load.

In many applications, it may be difficult or impossible to obtain transistors having the necessary combination of current gain and collector breakdown voltage to achieve the desired operation in the first and last stages. In such cases, the transistors 18–1 and 30–3 can be replaced by a series of two or even three transistors with each transistor being an emitter follower driving the base of the following transistor in a conventional manner to achieve high current gain. This type of arrangement is helpful in achieving the desired isolation with conventional components and minimizing the current necessary to turn on transistors 18–1 and 30–3 and initiate the discharge operation of the capacitors.

It may then be necessary to increase voltage drop in the forward direction in the circuit at the position of diodes 40 and 38 and to use, rather than one diode, two or even three series connected diodes to perform the desired function of isolation and control over the operation of the associated transistors 18–1 and 30–3. With isolation achieved, it is possible as pointed out above, to use two identical circuits to accomplish full-wave rectification of an input voltage applied by source 12. A single circuit is shown in detail in FIG. 2 and an identical circuit is connected between a pair of input leads 13A' and 13B' and a pair of output leads 13C' and 13D' to accomplish the full wave rectification. Leads 13A' and 13B' are connected across source 12 as shown and leads 13C' and 13D' across the load 14 as shown. The remaining portions of the circuit, not shown, are identical to the components shown to be connected between the input leads 13A and 13B and output leads 13C and 13D in FIG. 2.

Figure 3:
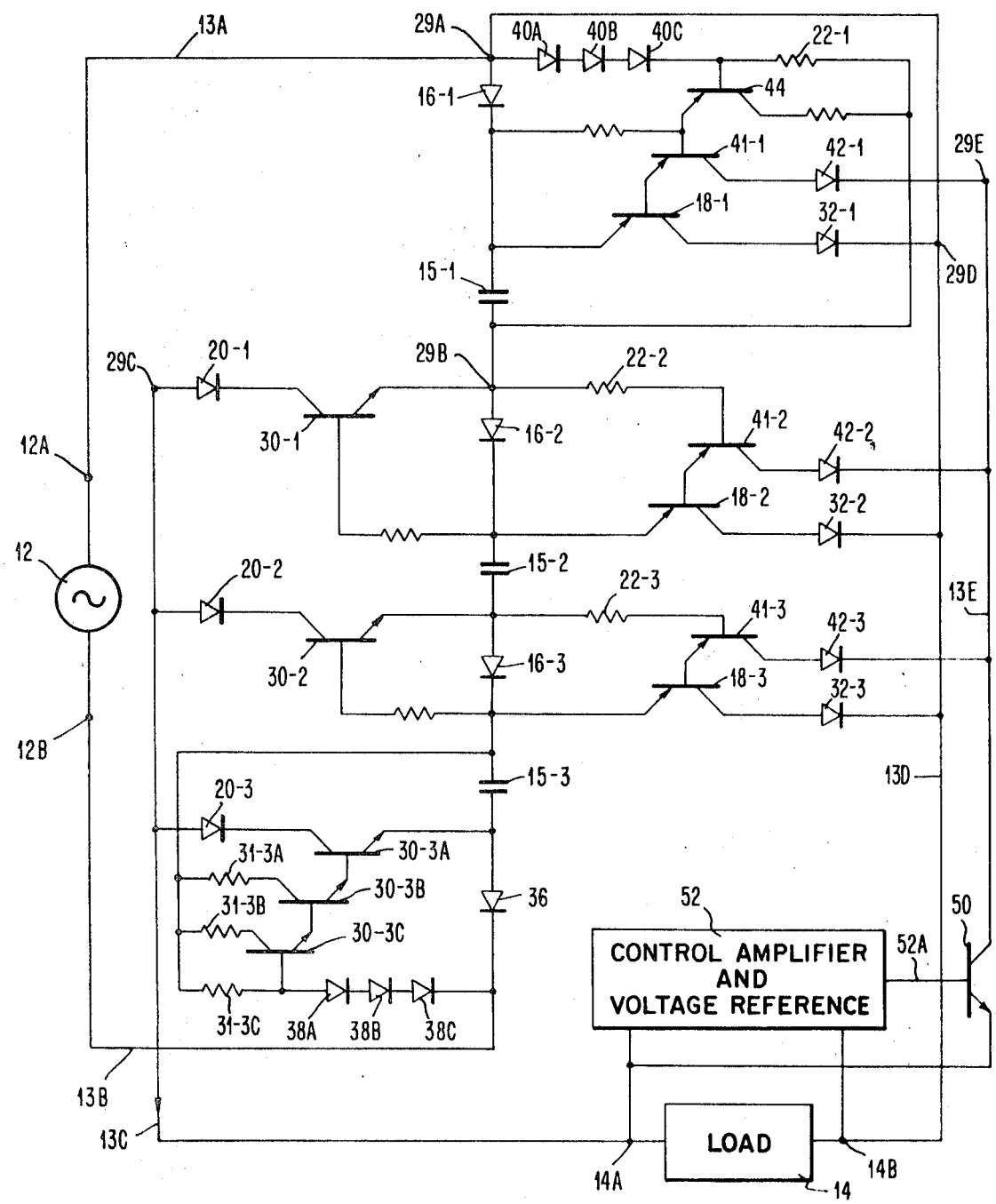
FIG. 3 is a circuit diagram of a further embodiment of a power supply according to the invention which includes components for regulating the output voltage.

In the circuit shown in FIG. 3, the power supply circuit is not only isolated but includes regulation. Each stage of the circuit here includes a fifth terminal 29E which is connected to a control bus 13E. The primary components added to the circuit to achieve regulation are the transistors 41–1, 41–2 and 41–3, and diodes 42–1, 42–2 and 42–3 which connect the collectors of these transistors to an output control line or bus 13E for the circuit. In the upper stage the single diode 40 of FIG. 2 has been replaced by three series connected diodes to provide a bigger voltage drop and a further transistor 44 has been added to provide current gain for the reasons stated above, that is, to improve the isolation and minimize leakage current. For the same reason, in the lower stage diode 38 of FIG. 2 has been replaced by three series connected diodes 38A, 38B and 38C, resistor 31–3 by three resistors 31–3A, 31–3B and 31–3C and transistor 31–3 by three transistors 30–3A, 30–3B, and 30–3C, connected as a series of emitter followers to provide increased current gain.

In the operation of the circuit of FIG. 3, the transistors 18–1, 18–2 and 18–3 operate to control the output and, therefore, are not necessarily operated in a saturation mode. However, the switching transistors 41–1, 41–2, 41–3, 30–1, etc., are operated in a saturation mode and the self-equalizing features mentioned above are maintained. More specifically, if for any reason there is a different voltage across the capacitor in one of the parallel legs of the output circuit, the operation of the transistors 41–1, 41–2, 41–3 in the saturation mode with their collector at the same potential during discharge ensures that the voltage across the capacitor remains essentially equal just as in the circuit of FIG. 1, the saturation of transistor 18 achieved this result.

The operation of the circuit of FIG. 3 is similar to that described above in that during the positive swing of the voltage at terminal 13A, the capacitors 15–1, 15–2 and 15–3 are charged in the series circuit including diodes 16–1, 16–2 and 16–3. At this time the voltage drop across these diodes ensures that the transistors do not conduct. Upon completion of the charging at the peak of the positive half-cycle, the transistors are turned on with each transistor in each stage controlling the next transistor until all of the transistors in each stage are conducting and the capacitors 15 are discharging in parallel across the load which is connected between leads 13C and 13D. Thus, considering the middle stage as illustrative, when the supply voltage decreases sufficiently, diode 16–2 is reverse biased and transistor 41–2 is turned on by the current flow through resistor 22–2 to the transistor base. This allows current flow through the emitter-collector circuit of transistor 41–2 to an extent determined by the voltage of bus 13E relative to the emitter of transistor 18–2. The collector of transistor 41–2 is connected to the control bus 13E and the emitter is connected to the base of transistor 18–2, which is thus effectively connected to bus 13E when current flows in resistor 22–2. The discharge current from capacitor 15–2 flows on one side of the capacitor through the emitter-collector circuit of transistor 18–2 and diode 32–2 to lead 13D. On the other side of the capacitor the circuit is completed through the emitter-collector circuit of transistor 30–2 and diode 20–2 to output lead 13C. The voltage regulation is achieved by controlling the voltage of bus 13E by a signal generated by control amplifier and voltage reference 52, in response to differences between the actual output voltage across load 14 and the desired value. The signal on the control bus varies in such a sense as to provide negative feedback, as in conventional regulated power supplies, so as to reduce the error between the actual and desired values of output voltage. Because the collectors of the transistors 41 are effectively connected together during discharge, all transistors 18 are controlled in the same way by the signal on bus 13E, and the output voltage is regulated at the desired value. The feedback for the control is achieved as shown in FIG. 3 by a transistor 50 which is in turn controlled by the conventional control circuit 52 which includes a control amplifier and voltage reference.

As in the embodiment of FIG. 2, the half-wave circuit of FIG. 3 can be used in full-wave applications using two identical circuits of the type shown with the input leads of the additional circuit (corresponding to leads 13A and 13B) inversely connected across the supply 12 and output leads (corresponding to leads 13C and 13D) being connected directly across the load. The same control circuit 52 can be connected to the outputs and control buses of both circuits to provide the desired control of the voltage regulation.

Though an analog type of control for voltage regulation is described above, switching regulation of the type generally employed in power supplies can also be employed. Further, though the primary application of the invention is in the rectification and transformation of an AC input voltage, the principles of the invention and disclosed circuits are readily adapted to the conversion of high voltage DC to lower voltage DC. In such an application, a free running switch is used to periodically connect and disconnect the input voltage and the power supply circuit. A similar type of controlled switching may be used to provide an AC output. It is further apparent that the amount of voltage transformation which is achieved varies with the number of stages used. In some applications involving complex machines, the AC line voltage may first be converted to, for example, 30 volts DC with the circuitry of the invention described above. The 30 volt output is then transmitted throughout the machine and locally converted with circuits of the invention to a 3 volt level at which the machine circuits operate. In this type of system the circuits for transforming and rectifying the AC line voltage to 30 volts is isolated but need not be regulated and the local converter circuits are regulated but need not be isolated.

I claim:

1. In a system including means for converting a high voltage input at a pair of input terminals to a lower voltage output at a pair of output terminals, a circuit comprising;
   a. a plurality of stages each including a capacitor and first and second current control elements said first and second control elements being a diode and a transistor, respectively,
   b. the first current control element and capacitor for each stage being connected together in series in a first circuit for each stage and the first circuits for all the stages being connected together in series in a charging circuit between said input terminals,
   c. the second current control element and capacitor for each stage being connected in series in a second circuit for each stage and all of said second circuits being connected in parallel in a discharging circuit between said first and second output terminals,
   d. and said first and second current control elements in each of said stages being interconnected so that when one is conducting the other is nonconducting said diode for each stage being connected between the base and emitter of the transistor for that stage to bias the transistor off when the diode is conducting.

2. The system of claim 1 wherein each stage includes a second transistor connected in the second circuit for each stage in series with capacitor and first named transistor for the stage.

3. The system of claim 2 wherein the said diode of each stage is connected between the emitter and base of the second transistor of the next stage.

4. The system of claim 3 wherein each stage includes an additional transistor connected to the first named transistor for controlling said first named transistor.

5. The system of claim 1 wherein said high voltage input is an AC input and said system includes two of said circuits each for converting one half-wave of the input voltage to a low voltage DC output.

6. A circuit for converting a high voltage AC input at a pair of input terminals to a lower voltage DC output at a pair of output terminals comprising:
   a. a plurality of stages each including a capacitor, a diode and a transistor,
   b. the diode and capacitor for each stage being connected in series between first and second terminals in a first circuit for each stage and said first and second terminals and said first circuits for all the stages being connected in series between said input terminals,
   c. the transistor and capacitor for each stage being connected in series between third and fourth terminals in a second circuit for each stage and all of said third and fourth terminals and said second circuits being connected in parallel between said output terminals,
   d. and the transistor and diode in each stage being interconnected so that when one is conducting the other is nonconducting said transistor for each stage including a control input for controlling current flow between first and second terminals of the transistor, the control input in each stage being coupled to one side of the diode for that stage and the other side of the diode being coupled to one of said terminals of the transistor.

7. The circuit of claim 6 wherein said coupling between said one terminal of said transistor and said diode for each stage is made by a connection at a point in the first series circuit for the stage between the diode and the capacitor for that stage.

8. The circuit of claim 6 wherein the control element of said transistor for each stage is coupled to one side of said diode for that stage by a circuit including another transistor having a control input for controlling current flow between first and second current terminals for the transistor.

9. The circuit of claim 8 wherein said another transistor for each stage has one of its terminals connected to a fifth terminal for the stage and fifth terminals for the stages are connected to a voltage regulation bus for the circuit.

10. The circuit of claim 6 wherein said second circuit between said third and fourth terminals for each stage include in series with said capacitor and transistor a further transistor.

11. The circuit of claim 10 wherein said further transistor for each stage includes a control input connected to a junction between the diode and capacitor in the first circuit for the next stage.

12 The circuit of Claim 6 wherein said circuit includes a first stage, a last stage and at least one stage between said first and last stages, and said first stage includes additional diodes in the circuit coupling the diode of that stage to the transistor for that stage.

13. A circuit for converting a high voltage input at a pair of input terminals to a lower voltage DC output at a pair of output terminals comprising:
   an AC source,
   a plurality of stages each including at least a capacitor,
   means connected to said plurality of stages for charging the capacitors in series for a time during each cycle of said AC source which is less than one-half of the period of said AC source and for discharging the capacitor in parallel for a time which is greater than one-half the period of said AC source.

14. The system of claim 13 including means coupled to said circuits for regulating the output voltage applied to said load.